(12) United States Patent
Schuchardt

(10) Patent No.: US 8,180,729 B2
(45) Date of Patent: May 15, 2012

(54) DATA REPLICATION METHOD

(75) Inventor: Bruce J. Schuchardt, Newberg, OR (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 13/079,933

(22) Filed: Apr. 5, 2011

(65) Prior Publication Data

US 2011/0184911 A1 Jul. 28, 2011

Related U.S. Application Data

(63) Continuation of application No. 11/982,563, filed on Nov. 2, 2007, now Pat. No. 8,005,787.

(51) Int. Cl.
*G06F 7/00* (2006.01)
*G06F 17/00* (2006.01)

(52) U.S. Cl. ......... 707/613; 709/224

(58) Field of Classification Search ......... 707/610, 707/615, 616, 619, 626, 613; 709/224
See application file for complete search history.

(56) References Cited

U.S. PATENT DOCUMENTS

| | | | | |
|---|---|---|---|---|
| 5,978,933 A * | 11/1999 | Wyld et al. | | 714/13 |
| 6,012,059 A * | 1/2000 | Neimat et al. | | 707/999.008 |
| 6,122,630 A * | 9/2000 | Strickler et al. | | 707/999.008 |
| 6,247,025 B1 | 6/2001 | Bacon | | |
| 6,324,495 B1 * | 11/2001 | Steinman | | 703/17 |
| 6,438,558 B1 * | 8/2002 | Stegelmann | | 707/615 |
| 6,449,734 B1 * | 9/2002 | Shrivastava et al. | | 714/15 |
| 6,681,226 B2 | 1/2004 | Bretl et al. | | |
| 6,738,977 B1 | 5/2004 | Berry et al. | | |
| 6,829,769 B2 | 12/2004 | Cranston et al. | | |
| 7,017,160 B2 | 3/2006 | Martin et al. | | |
| 7,039,661 B1 * | 5/2006 | Ranade | | 707/610 |
| 7,131,120 B2 | 10/2006 | Veselov | | |
| 7,143,392 B2 | 11/2006 | Li et al. | | |
| 7,152,231 B1 | 12/2006 | Galluscio et al. | | |
| 7,171,663 B2 | 1/2007 | Moore et al. | | |
| 7,177,866 B2 * | 2/2007 | Holenstein et al. | | 707/615 |
| 7,188,125 B1 * | 3/2007 | Karr | | 707/999.204 |
| 7,188,145 B2 | 3/2007 | Lowery et al. | | |
| 7,606,841 B1 * | 10/2009 | Ranade | | 707/615 |
| 7,610,319 B1 * | 10/2009 | Kekre et al. | | 707/999.008 |
| 7,624,155 B1 * | 11/2009 | Nordin et al. | | 709/208 |
| 2001/0014905 A1 | 8/2001 | Onodera | | |
| 2002/0194015 A1 * | 12/2002 | Gordon et al. | | 705/1 |
| 2003/0097360 A1 | 5/2003 | McGuire et al. | | |
| 2004/0025171 A1 | 2/2004 | Barinov et al. | | |
| 2004/0078637 A1 * | 4/2004 | Fellin et al. | | 714/6 |
| 2004/0088489 A1 * | 5/2004 | Hironaka et al. | | 711/131 |
| 2004/0133591 A1 * | 7/2004 | Holenstein et al. | | 707/102 |
| 2004/0199828 A1 | 10/2004 | Cabezas et al. | | |
| 2005/0086656 A1 | 4/2005 | Whitlock et al. | | |
| 2006/0230082 A1 * | 10/2006 | Jasrasaria | | 707/204 |

OTHER PUBLICATIONS

Meyer, Jon et al. "Java Virtual Machine" users manual, 1997, pp. 1-232, O'Reilly & Associates, First Edition, California, US.
Burd, Barry, "Java 2 for Dummies" user's manual, 2001, pp. 1-194, Hungry Minds, Inc. New York, US.

(Continued)

*Primary Examiner* — Phong Nguyen

(57) ABSTRACT

To ensure data consistency for a new data replica created for a computing system, the transmission and receipt of messages altering the data are monitored and replication of the data is permitted when all changes to the data that have been transmitted to the data have been received.

20 Claims, 3 Drawing Sheets

OTHER PUBLICATIONS

Jaworski, Jamie, "Java 1.1 Developer's Guide" Second Edition, Sams.net Publishing, 1997, pp. 3-10, 17-20, 90-92, 372-383 and 983-984, 986-990.

Glass, Graham, "Web Services Building Blocks for Distributed Systems," Prentice Hall PTR, 2002, pp. 55-70.

Silberschatz et al., "Applied Operating System Concepts," First Edition, John Wiley & Sons, Inc. 2000, pp. 61-64, 74-77, 87-114, 507-518.

Chandy, K. Mani et al., "Distributed Snapshots: Determining Global States of Distributed Systems," ACM Transactions on Computer Systems, vol. 3, No. 1, Feb. 1985, pp. 63-75.

Olofson, Carl W. et al. "White Paper: Overcoming the Data Bottleneck to Delivery Dynamic IT: GemStone's GemFire with IBM's BladeCenter," Publication of IDC Information and Data, Copyright 2005 IDC pp. 1-11.

"Performance, Availability and Real-Time Intelligence for Online Portals—Achieving this Triple Convergence with the GemFire Enterprise Data Fabric (EDF)," Gemfire EDF Technical White Paper, Copyright 2005 by GemStone Systems, Inc., pp. 1-15.

"GemFire Enterprise" Gemfire Enterprise Technical White Paper, Copyright 2007, pp. 1-26, by GemStone Systems.

Haase, Kim, "Java Message Service API Tutorial," 2002, pp. 1-278, Sun Microsystems.

\* cited by examiner

DATA REPLICATION METHOD

CROSS-REFERENCE TO RELATED APPLICATION(S)

This application is a continuation of U.S. patent application Ser. No. 11/982,563 filed Nov. 2, 2007, which is incorporated by reference herein.

BACKGROUND OF THE INVENTION

The present invention relates to distributed computing systems and, more particularly, to a method of replicating data managed by a data fabric communication network that interconnects the nodes of a distributed computer system.

A data fabric is a communication network that interconnects a plurality of distributed computation nodes of a computer system. The distributed computing nodes may be performing a plurality of processes and the data fabric enables the nodes to exchange data and use the data in the performance of the process(es) executing on the local node. The data fabric provides a data infrastructure that distributes and replicates data enabling data to be stored in a distributed memory so that the data may be utilized at high rates with low latency and be frequently updated by a plurality of processes being executed by one or more of the distributed computing nodes of the system.

Distributed data caching is a central feature of a data fabric network, such as GemFire Enterprise® data fabric from Gemstone Systems Inc. A cache provides temporary storage for data obtained from a data source enabling subsequent local use of the data without the necessity of repeatedly downloading the data from the data source. For example, a data cache may be used to temporarily store, at a local computer, data that is downloaded from an Internet web site. Latency in the use of the data is substantially reduced by the using the data in the local cache rather than downloading the data from a remote source for each use. The replication of data also provides redundant data storage for the system. If a process holding a replica of data fails, the data can be made available from other replicas held by other processes of the system. The GemFire Enterprise data fabric provides data management enabling creation of a plurality of local data caches consistent with the other data sources of the system and the updating of a plurality of replicas of the data to reflect the changes resulting from the use of the data by the nodes of a distributed system.

The GemFire Enterprise data fabric comprises processes to enable data consistency among the various replicas held by the system when a new replica of a data region, a portion of the system's data, is created. Messages communicating changes in the data of a data region are addressed to the various processes of the system holding a replica of the effected data region. When a new replica of the data is to be created, the GemFire Enterprise data fabric notifies the various processes utilizing the data to be replicated of the intention to create a new replica of the data region by copying one of replicas of the data region held by one of the system's processes and directs the processes to forward any new changes to the data to a new group of processes that includes the process in which the new replica is to be created. The process in which the new replica is to be created stores any changes to the data that are received and following creation of the new replica the data of the new replica is updated for any stored changes to the data. All of the processes utilizing the data of the replicated data region capture the changes to the data that were made after the intention to create the new replica is announced to the processes executing on the computing system. However, a change in the data that was made by a process prior to receipt of the notice of intention to create a new replica and which was transmitted to the existing replicas, but not received by the replica to be copied before the data is replicated may not be captured. The possibility that "in-flight" changes to the data may not be captured jeopardizes data consistency for the distributed system.

What is desired, therefore, is a method of replicating data that ensures that the changes to the data that are transmitted before replication will be incorporated in the replicated data.

DETAILED DESCRIPTION OF PREFERRED EMBODIMENTS

Figure 1:
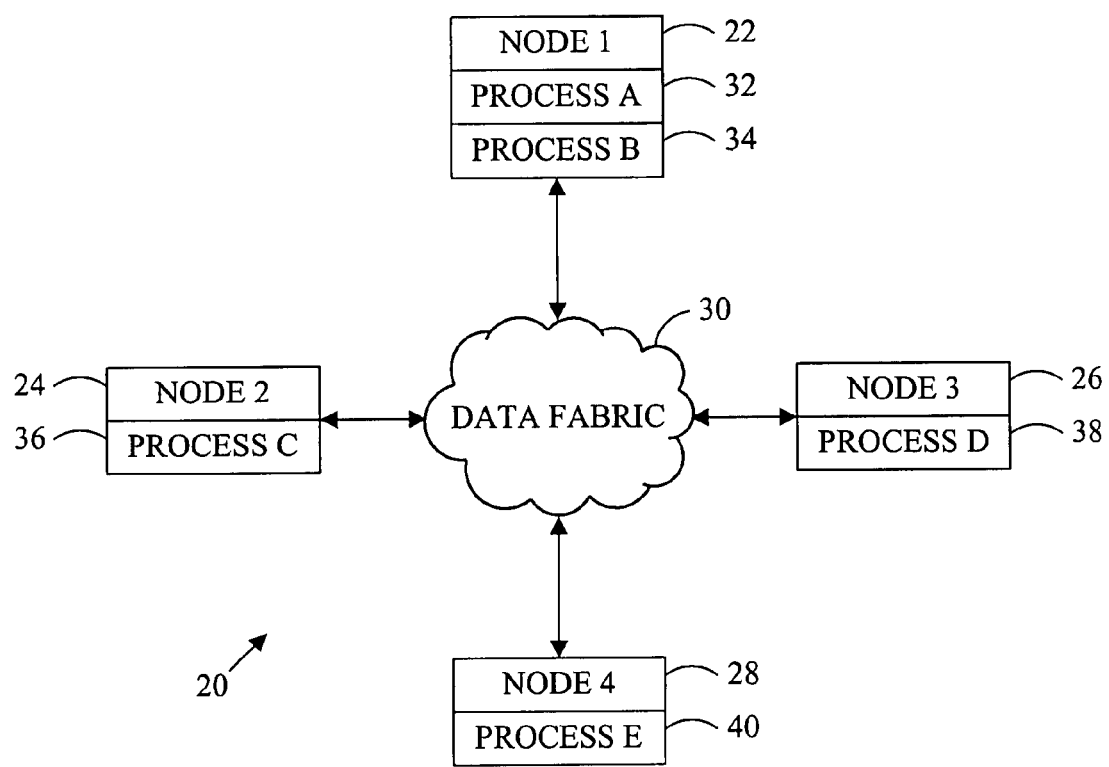
FIG. 1 is a block illustration of a distributed computing system.

Referring in detail to the drawings where similar parts are identified by like reference numerals, and, more particularly to FIG. 1, an exemplary distributed computing system 20 includes a plurality of computing nodes 22, 24, 26, 28 that are communicatively interconnected by a data fabric 30. The type of software executing on the nodes and the type of hardware that implements each node depends upon the application and may vary. For example, the nodes may be personal computers connected to a server presenting data for a website or the nodes may be a number of processors operating in parallel in a computer. Each node of the computing system may be executing one or more programs or processes 32, 34, 36, 38, 40 and some of the processes may utilize data which is held by one or more other processes and may, as a result of execution of the process, alter the values of the data held by the other process(es). The data fabric provides an operational data infrastructure that distributes and replicates data to enable storage of the data across a memory that may distributed among a plurality of the nodes. Distributed storage and replication of data enables processes to rapidly access the data from a local cache reducing the latency of the computing system and provides redundancy enabling the computing system to continue to access the data even if a process holding the data fails.

Figure 2:
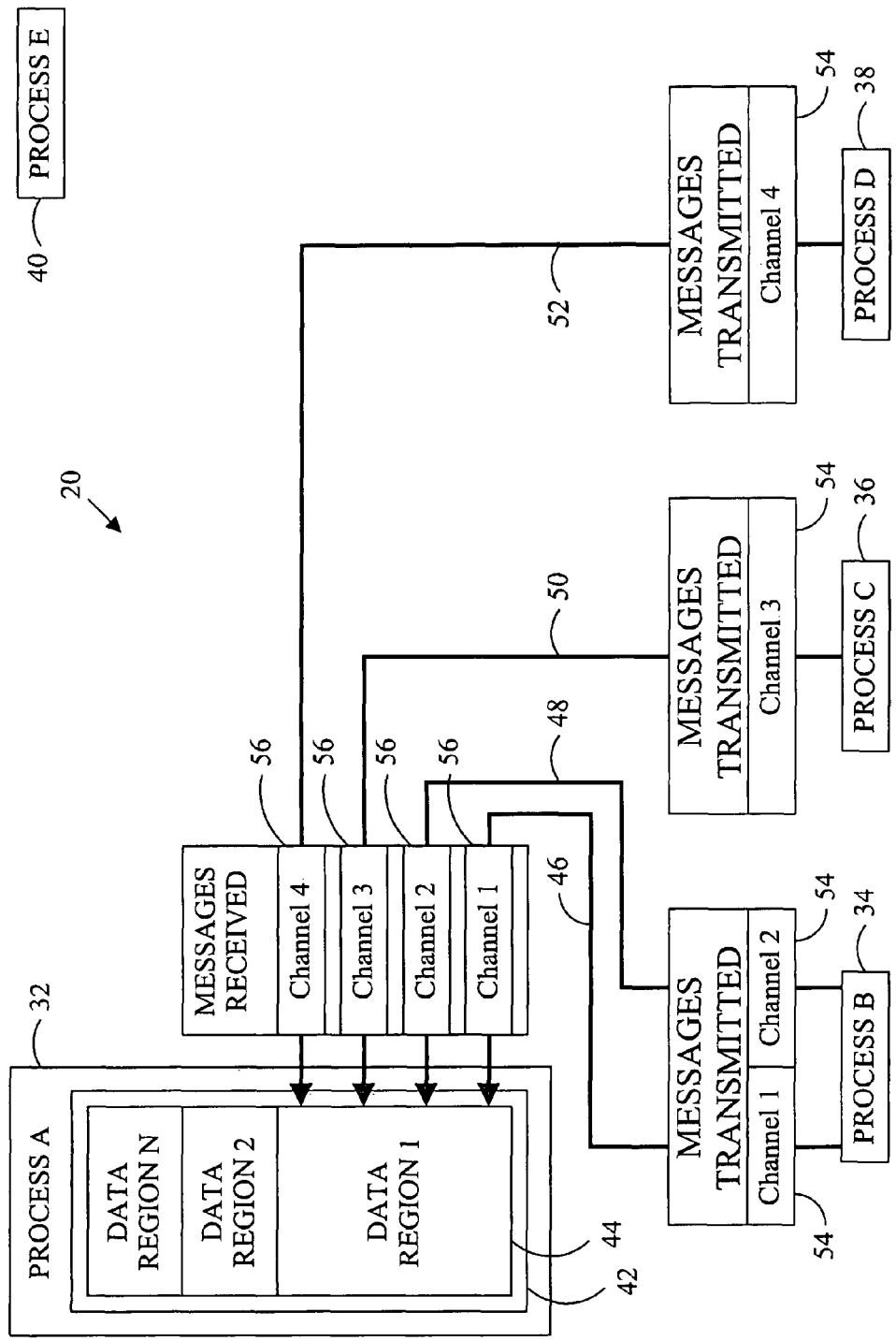
FIG. 2 is a block illustration of a plurality of processes utilizing data from a source.

Referring to FIG. 2, in a second representation of the exemplary distributed computing system 20 a process A 32 executing on the system holds a plurality of data 42 . The data may be divided into a plurality of data regions, such as data region 44. Typically, the data regions comprise a plurality of like or related data. Five processes, process A, process B 34 , process C 36 , process D 38 and process E 40 are being executed on the exemplary system. All of the processes are using the data of data region 1 and, typically, holding replicas of the region's data.

When one of the processes B-D, alters a datum of data region 1, the change is transmitted to the group of processes using the datum or holding replicas of data region 1. The change is transmitted to process A over one of a plurality of communication channels, channel 1 (46), channel 2 (48), channel 3 (50) and channel 4 (52), that connect data region 1 to the respective processes that utilize the regions' data. If process B changes the data of data region 1, a message with the new value of the data is transmitted to the data region over either communication channel 1 or communication channel 2. Similarly, a change to data region 1 produced by process C is transmitted to data region 1 over communication channel 3 and a change to the data region by process D is transmitted over communication channel 4. At anytime, processes B, C, or D may be executing an operation that alters data region 1 and one or more messages reflecting change(s) in the data may be in transit to the data region on one of the communication channels that interconnects the processes and data region 1.

The message traffic of each of the communication channels of the computing system 20 is monitored by the computing system. A transmission monitor 54 monitors message transmissions on each communication channel and a reception monitor 56 tracks the receipt of messages for each channel. The monitors may comprise counters that log the number of messages transmitted and received or may comprise another device that tracks another metric that indicates that a message received by the data region from a communication channel is as current as the messages transmitted over the channel.

Figure 3:
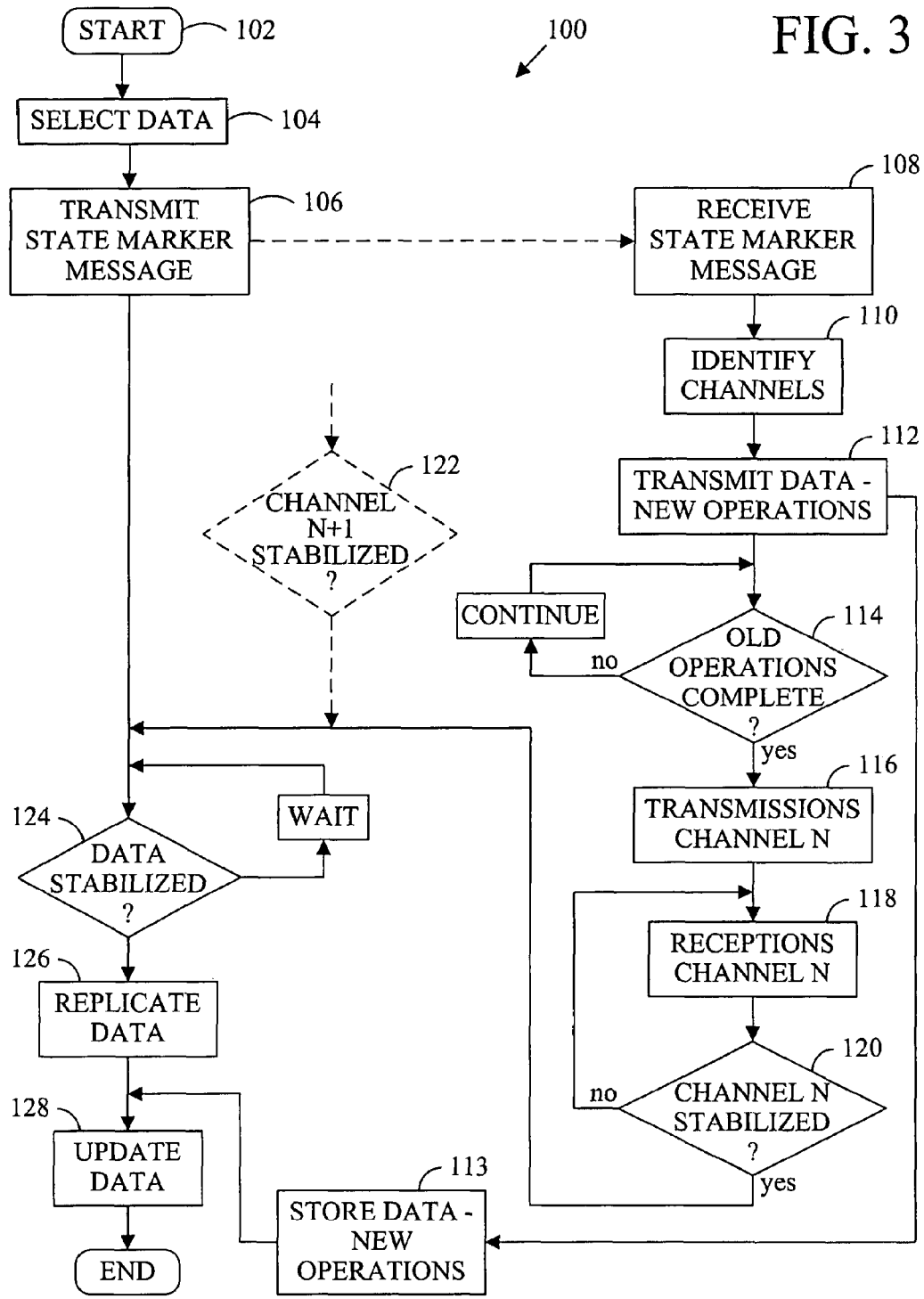
FIG. 3 is a flow diagram of a method of replicating data.

To provide redundant data storage, a local data cache to reduce latency, or to suit another purpose, it is desired that the data of data region 1 be replicated in process E 40. Referring to FIG. 3, the process of data replication 100 is initiated 102 when data region 1 is selected for replication 104 in, for example, Process E. The intention to replicate the data region is announced to the processes executing on the system by the transmission of a state marker message 106 to each of the processes using or holding the data. When the state marker message is received 108, each process identifies the communication channel(s) 110 that connects it to the replica of data region 1 in Process A. The processes utilizing or holding replicas of data region 1 are directed to communicate all changes in the data of data region 1, resulting from operations undertaken subsequent to the receipt of the notice of intent to replicate, to a new group of recipients that includes the process in which the new replica will be created 112, Process E. The process in which the new replica will be created, Process E, stores the changes to the data resulting from the "new operations" 113. Operations undertaken before receipt of the state marker message are completed 114 and any changes to data region 1 are transmitted to all the existing replicas of data region 1, including the replica held by Process A which is to be copied.

With the completion of operations undertaken before receipt of the state marker message, the state of each communication channel is determined. The status of the transmission monitor for each communication channel connected to the replica of the data to be copied is determined 116. For example, the number of messages transmitted to the existing group of users or holders of existing replicas of the data region is determined. Likewise, the status of reception monitor is determined 118. If messages directed to the group of processes using or holding a replica of data region 1 have been transmitted over the channel 120 but have not been received by data region 1, the system continues monitoring the communication channel. If all of the messages that have been transmitted over the communication channel to existing holders or users of the data have been received 120, the communication channel is stabilized. The data of the replica of data region 1 held by Process A has stabilized 124 and when all of the communication channels 122 connected to Process A's replica of data region 1 have stabilized. Alternatively, when all of the communication channels connecting a process and Process A's replica of data region 1 have stabilized when the data of the replica has stabilized as to the respective process. Process E may be notified that the data to be replicated has stabilized 124 with respect to a process when all of the communication channels connecting the process and the replica of the data have stabilized or when all communication channels communicating changes to the replica to be copied have stabilized.

When the data of Process A's replica of data region 1 has stabilized with respect to all processes 124, that is, when all of the messages addressed to existing holders and users of the data to be copied and transmitted to the replica of data region 1 held by Process A over all of the communication channels connecting the system's processes to the replica of data region 1 have been received, the data region is replicated 126 in Process E. When replication is complete, the new replica in Process E, is updated 128 from the stored "new operations" data completing the replication process. The results of any subsequent operation on the data is communicated to all replicas of the data, including the replica held by Process E.

The data replication process ensures data consistency by monitoring the communication channel(s) communicating changes to the data that is to be replicated to determine if changes are "in flight" from one or more processes. "In flight" changes are incorporated in the data to be replicated to prevent newer data from being overwritten by older data that is contained in the data region that is being copied.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A method of replicating a data region of a distributed data storage system, wherein the distributed data storage system comprises a plurality of computing nodes, each computing node capable of storing data regions and supporting processes that access data regions, the method comprising:

transmitting a message indicating an intention to replicate a data region managed by a first process of a first computing node for a second process, wherein the message is transmitted to a plurality of processes that currently access, through at least one communication channel, the data region and thereby cause each of the processes in the plurality of processes to transmit subsequent update operations made by the process to the data region to the second process;

monitoring a status of each of the communication channels to determine whether a number of in-flight update operations transmitted to the data region are received and applied to the data region, wherein in-flight update operations are transmitted prior to the transmission of the message, but not applied by the data region prior to the transmission of the message; and replicating the data region upon confirmation that the number of in-flight update operations has been received by and applied to the data region to create a replica of the data region for the second process, wherein the subsequent update operations are applied to the replica of the data region by the second process and the in-flight update operations are not applied to the replica of the data region by the second process.

2. The method of claim 1, further comprising the steps of causing the second process to temporarily store the subsequent update operations transmitted by the processes until replication of the data region has been completed; and performing the stored subsequent update operations after the data region has been replicated for the second process.

3. The method of claim 1, wherein the second process corresponds to a second computing node.

4. The method of claim 1, wherein at least one of the plurality of processes further accesses a previous replica of the data region residing at a computing node other than the first computing node.

5. The method of claim 4, wherein the previous replica is a cache of the data region stored at the computing node corresponding to the at least one process accessing the previous replica.

6. The method of claim 1, wherein, for each communication channel, the monitoring step utilizes a transmission monitor component at the corresponding process that logs a number of update operations transmitted by the corresponding process and a reception monitor component at the data region that logs a number of update operations received by the data region.

7. The method of claim 1, wherein the data region is a subset of data accessible through the distributed data storage system.

8. A non-transitory computer-readable storage medium comprising instructions that when executed on a plurality of computing nodes of a distributed data storage system, each computing node capable of storing data regions and supporting processes that access data regions, cause the distributed data storage system to replicate a data region by performing the steps of:
    transmitting a message indicating an intention to replicate a data region managed by a first process of a first computing node for a second process, wherein the message is transmitted to a plurality of processes that currently access, through at least one communication channel, the data region and thereby cause each of the processes in the plurality of processes to transmit subsequent update operations made by the process to the data region to the second process;
    monitoring a status of each of the communication channels to determine whether a number of in-flight update operations transmitted to the data region are received and applied to the data region, wherein in-flight update operations are transmitted prior to the transmission of the message but not applied by the data region prior to the transmission of the message; and
    replicating the data region upon confirmation that the number of in-flight update operations has been received by and applied to the data region to create a replica of the data region for the second process, wherein the subsequent update operations are applied to the replica of the data region by the second process and the in-flight update operations are not applied to the replica of the data region by the second process.

9. The non-transitory computer-readable medium of claim 8, further including instructions to perform the steps of causing the second process to temporarily store the subsequent update operations transmitted by the processes until replication of the data region has been completed; and performing the stored subsequent update operations after the data region has been replicated for the second process.

10. The non-transitory computer-readable medium of claim 8, wherein the second process corresponds to a second computing node.

11. The non-transitory computer-readable medium of claim 8, wherein at least one of the plurality of processes further accesses a previous replica of the data region residing at a computing node other than the first computing node.

12. The non-transitory computer-readable medium of claim 11, wherein the previous replica is a cache of the data region stored at the computing node corresponding to the at least one process accessing the previous replica.

13. The non-transitory computer-readable medium of claim 8, wherein, for each communication channel, the monitoring step utilizes a transmission monitor component at the corresponding process that logs a number of update operations transmitted by the corresponding process and a reception monitor component at the data region that logs a number of update operations received by the data region.

14. The non-transitory computer-readable medium of claim 8, wherein the data region is a subset of data accessible through the distributed data storage system.

15. A distributed data storage system comprising a plurality of computing nodes, wherein each computing node is capable of storing data regions and supporting processes that access data regions and wherein the plurality of computing nodes are configured to perform the steps of:
    transmitting a message indicating an intention to replicate a data region managed by a first process of a first computing node for a second process, wherein the message is transmitted to a plurality of processes that currently access, through at least one communication channel, the data region and thereby cause each of the processes in the plurality of processes to transmit subsequent update operations made by the process to the data region to the second process;
    monitoring a status of each of the communication channels to determine whether a number of in-flight update operations transmitted to the data region are received and applied to the data region, wherein in-flight update operations are transmitted prior to the transmission of the message but not applied by the data region prior to the transmission of the message; and
    replicating the data region upon confirmation that the number of in-flight update operations has been received by and applied to the data region to create a replica of the data region for the second process, wherein the subsequent update operations are applied to the replica of the data region by the second process and the in-flight update operations are not applied to the replica of the data region by the second process.

16. The distributed data storage system of claim 15, wherein the plurality of computing nodes are further configured to perform the steps of causing the second process to temporarily store the subsequent update operations transmitted by the processes until replication of the data region has been completed; and performing the stored subsequent update operations after the data region has been replicated for the second process.

17. The distributed data storage system of claim 15, wherein the second process corresponds to a second computing node.

18. The distributed data storage system of claim 15, wherein at least one of the plurality of processes further accesses a previous replica of the data region residing at a computing node other than the first computing node.

19. The distributed data storage system of claim 18, wherein the previous replica is a cache of the data region stored at the computing node corresponding to the at least one process accessing the previous replica.

20. The distributed data storage system of claim 15, wherein, for each communication channel, the monitoring step utilizes a transmission monitor component at the corresponding process that logs a number of update operations transmitted by the corresponding process and a reception monitor component at the data region that logs a number of update operations received by the data region.

* * * * *